United States Patent [19]

Ballou

[11] 4,116,663

[45] Sep. 26, 1978

[54] PLANT IRON SOURCE, PLANT GROWING MEDIUM, AND METHODS OF MAKING AND USING SAME

[76] Inventor: John McK. Ballou, 3105 E. Coolidge St., Long Beach, Calif. 90805

[21] Appl. No.: 743,304

[22] Filed: Nov. 19, 1976

Related U.S. Application Data

[63] Continuation-in-part of Ser. No. 596,421, Jul. 16, 1975, abandoned.

[51] Int. Cl.$^2$ ............................................. C05F 11/00
[52] U.S. Cl. ........................................ 71/23; 71/25;
71/64 SC; 71/DIG. 2; 47/1 A; 47/DIG. 10;
47/DIG. 4
[58] Field of Search .................. 71/1, 11, 23, 31, 24,
71/63, 64 C, 64 SC, DIG. 2, 25; 260/239 R,
473.5, 473.6; 47/1 A, 1 R, 11, 48.5, 58, DIG.
10, DIG. 4

[56] References Cited

U.S. PATENT DOCUMENTS

| 2,735,858 | 2/1956 | Bergman | 260/239 R |
| 3,270,003 | 8/1966 | Van Blaricom et al. | 71/1 |
| 3,473,255 | 10/1969 | Working | 47/58 |

FOREIGN PATENT DOCUMENTS

| 1,347,558 | 2/1974 | United Kingdom | 71/63 |

*Primary Examiner*—Ferris H. Lander
*Attorney, Agent, or Firm*—Thomas A. Fournie

[57] ABSTRACT

Iron (FE) may be reacted in the presence of an alkaline material with vegetable tannin by mixing water ($H_2O$), comminuted iron in its elemental state and vegetable tannin to form an iron chelate which holds iron in a form available to and assimilable by plants. Treatment of plants with the iron chelate supplies iron thereto and corrects iron chlorosis. Comminuted cast iron and vegetable tannin extract may be used, respectively, as the Fe and vegetable tannin sources. Further, comminuted redwood, which is known to be poisonous to many plants in its natural state, is believed to be converted into a nonpoisonous growing medium which supplies iron to plants and stimulates plant growth by reacting the vegetable tannin naturally occurring in the redwood to form the aforementioned iron chelate therein.

26 Claims, No Drawings

PLANT IRON SOURCE, PLANT GROWING MEDIUM, AND METHODS OF MAKING AND USING SAME

CROSS-REFERENCE TO RELATED APPLICATION

This is a continuation-in-part of application Ser. No. 596,421, filed July 16, 1975, and now abandoned.

BACKGROUND OF THE INVENTION

The present invention relates to the science and art of growing plants. Plant is here used in a broad sense to include trees, shrubs, bushes, flowers, crops, vegetables, herbs and the like.

The science and art of growing plants is largely empirical. Heretofore, it has been observed that the leaves of plants lacking iron will yellow. This condition is referred to as iron chlorosis or iron deficiency, and if allowed to continue in a given plant may cause its death.

It has also been observed that iron deficiency in plants is rarely due to the lack of iron in the soil. Rather, iron deficiency in plants is generally caused by some other substance in the soil making the iron unavailable to the plants. For example, iron in the form of either hematite ($Fe_2O_3$) or magnetite ($Fe_3O_4$) is not available to nor assimiable by plants. The presence of lime [$Ca(OH)_2$] or other alkaline materials (pH more than 7) has been found to cause conversion of iron in the soil to one of these plant unuseable forms, i.e., either to hematite or magnetite.

Heretofore, to correct iron chlorosis in plants, the soil or the plants have been generally treated with either ferrous sulfate ($FeSO_4$) or with a known type of iron chelate.

Ferrous sulfate itself does hold iron in a form which is available to and assimilable by plants. However, the use of ferrous sulfate to supply iron to plants and correct iron chlorosis has its drawbacks and is limited. For example, ferrous sulfate is unsuitable for use with soil containing lime [$Ca(OH)_2$] or another alkaline material since the alkaline material will convert the ferrous sulfate to either hematite or magnetite. Further, if a source of ammonia ($NH_3$) is added to soil containing ferrous sulfate (as may be done to supply nitrogen to plants), the ferrous sulfate is again in this instance converted to either hematite or magnetite.

Prior art iron chelates also hold iron in a form which is available to and assimilable by plants. Such iron chelates are generally either applied to soil in which the plants are growing or to the plants as a foliar spray. Typically, these chelates are not subject to the aforementioned drawbacks associated with the use of ferrous sulfate. A significant disadvantage, however, limiting the use of most, if not all, prior art iron chelates is that they are relatively expensive to prepare and costly to buy.

It has additionally been determined that the wood of the redwood tree, i.e., sequoia sempervirens, when in a natural untreated state has an acid pH in the neighborhood of 4.5. Further, it has been found that redwood when applied to soil in a comminuted state, i.e., in the form of sawdust, chips or the like, is extremely poisonous to many plants. The exact reason for this poisonous characteristic of redwood is unknown, but it is believed that the reason is other than mere acidity. Nevertheless, it has been observed that if comminuted redwood is treated with an alkaline, such as ammonium hydroxide ($NH_4OH$), calcium hydroxide [$Ca(OH)_2$] or the like, to neutralize its inherent acidity that its poisonous characteristic disappears and the comminuted redwood then provides an excellent growing medium. Such neutralized redwood sawdust is commonly sold and used throughout California as a growing medium and soil amendment. The term soil amendment is here used to indicate a material which is added to or placed upon soil or a growing medium and as a result becomes a part thereof from which a plant feeds.

One drawback with the use of neutralized redwood as or as part of a growing medium is that it lacks plant available iron. Further, if one adds a plants source of iron, such as ferrous sulfate, to the comminuted neutralized redwood the alkaline material therein added to eliminate the poisonous characteristic of the redwood acts to convert the ferrous sulfate, as earlier mentioned, to either hematite or magnetite. Thus, heretofore, the only known way to supply plant available iron to soil containing neutralized redwood would be to use one of the relatively expensive prior art iron chelates.

SUMMARY OF THE INVENTION

It is an object of the present invention to provide an improved growing medium for plants.

It is also object of the present invention to provide an improved and new source of iron for plants in the form of a heretofore unknown and unrecognized iron chelate characterized by being relatively inexpensive to manufacture and not subject to the drawbacks herein mentioned in connection with use of ferrous sulfate as a plant source of iron.

It is another object of the present invention to provide an improved method for making an iron chelate source of iron for plants characterized by being surprisingly and unexpectedly reliable and simple, and also relatively inexpensive.

It is further an object of the present invention to provide an improved method for supplying iron to plants characterized by being inexpensive and effective.

It is additionally an object of the present invention to provide an improved redwood growing medium for plants suitable for use as soil or as a soil amendment which supplies plant available iron, is nonpoisonous and stimulates plant growth.

It is yet another object of the present invention to provide an improved method for supplying iron to plants and stimulating plant growth.

It is still another object of the present invention to provide an economically advantageous use for the presently inexpensive and frangible waste material cast iron borings.

In accomplishing these and other objects, iron (Fe) is reacted with vegetable tannin to form an iron chelate which holds iron in a form available to and assimilable by plants. The Fe is reacted with the vegetable tannin in the presence of $H_2O$ by mixing water, vegetable tannin and comminuted iron in its elemental state. Comminuted cast iron and vegetable tannin extract may be used, respectively, as the source of the elemental Fe and vegetable tannin. Treatment of plants with the iron chelate supplies iron thereto and corrects iron chlorosis.

Further, comminuted redwood, which is known to be poisonous to many plants in its natural state, is believed to be converted surprisingly and unexpectedly into a nonpoisonous growing medium which supplies iron to plants and stimulates plant growth by reacting the vegetable tannin naturally occurring in the redwood with Fe to form the aforementioned iron chelate therein.

Additional objects of the present invention reside in the detailed description of the preferred embodiments of the invention hereinafter set forth.

DETAILED DESCRIPTION OF THE PREFERRED EMBODIMENT

In the present state of the art of agriculture it is necessary to add fertilizing matter to the soil in order to improve the soil depleted of necessary elements required by plants for a healthy and productive growth. Means of adding nitrogen, phosphorous and potash to the soil is well known. There are, however, obstacles to the customary means of enriching the soil with iron in the form of ferrous sulfate. With the use of this compound of iron and the use of ammonia as a source of nitrogen the result is its conversion to hematite or magnetite from which plants cannot derive any iron. However, if the iron is in the form of a chelate, ammonia and other alkaline chemicals precipitate out no iron as an insoluble hydroxide that ends up as hematite or magnetite, both useless to plants.

I have discovered a reliable and simple method, which in my opinion is both surprising and unexpected, for converting iron (Fe) into an iron chelate source of iron for plants by reacting the Fe with vegetable tannin. As pointed out hereinafter, the vegetable tannin may be of either the katechol or pyrogallol type. Further, my discovery may utilize the relatively inexpensive waste material cast iron borings as the source of Fe. Cast iron borings provide iron in an elemental state, and iron in its elemental state when reacted with the vegetable tannin is neither converted to hematite nor magnetite by the presence of alkaline material. Thus, elemental Fe, vegetable tannin and $H_2O$ can be reacted even in the presence of alkaline material.

Cast iron borings, available in almost any locality in the United States, are a byproduct of machining cast iron. Per se, this material is useless in agriculture but it is frangible and easily reduced to a fine powder by grinding and sifting. The other elements present in cast iron, such as carbon and manganese, are either beneficial or at least nondetrimental to plants. The main ingredient of cast iron, amounting to over 90%, is elemental metallic iron. It is noted that the cast iron presently available from which borings are obtainable generally contains from 90–92% Fe. It is further noted, as indicated supra, that unreacted iron, i.e. Fe per se, is not a plant available source of iron. Thus, the adding of cast iron borings themselves to a plant growing medium would not supply the plant with iron and would not correct iron chlorosis. It is additionally noted that since the cast iron from which the borings are obtained is frangible, it thus can be readily and inexpensively broken or ground to a suitable sized comminuted state.

Leather tanners recognize two types of vegetable tannin, namely, what they designate as the katechol type and what they designate as the pyrogallol type. The katechol type is used for tanning soft leather such as used in vests and jackets. The pyrogallol type is used in tanning hard leather such as that used in the soles of shoes and in power transmission belts. To tan leather with the katechol type tannin, tanners use quebracho extract or wattle extract. To tan leather with the pyrogallol type of tannin tanners may use chestnut extract. All three of these extracts are articles of commerce, carried by dealers in tanners supplies. I do not make any distinction between them as I have found both types useful for my purposes and hereinafter my use of the expression vegetable tannin should be understood to mean either type or a mixture of both, or of the extract of which the tannin is an ingredient.

It is here noted the vegetable tannin or tannin of the types above-mentioned are also contained in other woods, such as redwood (*sequioa sempervirens*) or the other various long time known sources of tannin discussed, for example, in pages 689–701 of *General and Industrial Chemistry* by Dr. Ettore Molinari (Second English Edition 1923), published by P. Blakiston's Sons & Co., 1012 Walnut St. Philadelphia, Pa.

I found that 9 to 25 parts by weight of tannin extract to 1 part by weight of the powdered cast iron gives a satisfactory chelate, with water sufficient to impart a slurry consistency to the mass, and after standing for a few hours with occasional stirring, the water solution and suspension may be filtered through chemist's filter paper, leaving a small amount of filter residue and considerable black filtrate. This residue proved to be carbon, silica and traces of other matter, perhaps carbides and sulfides, but of no importance here. There is no precipitate formed by adding aqua ammonia to the black filtrate. By drying and incinerating the filtrate a solid remains. By adding a mixture of dilute nitric and hydrocholoric acids to this solid it all dissolves and upon adding a water solution of potassium ferrocyanide to this solution a very strong blue color develops, thus proving the black filtrate to be a dissolved chelate of iron. I have found that the roots of plants can obtain the required iron from this chelate.

In order to further elucidate I am giving two examples.

EXAMPLE 1

I prepared a chelate by dissolving 10 grams of katechol tannin extract in water and adding thereto 1 gram of cast iron powder of 100 mesh minus particle size on the Tyler screen scale. This was stirred occasionally during 8 hours. This will be called the katechol chelate. I prepared another similarly using pyrogallol type tannin extract. I prepared 3 flower pots each with equal parts of sterile sand and a fertilizer with adequate nitrogen, phosphorus and potash using equal quantities of said fertilizer mix, which I knew to be devoid of assimilable iron. Any iron contained in this fertilizer being known to be hematite and magnetite.

To the first flower pot I added nothing; to the second I added $\frac{1}{2}$% of the katechol chelate, and to the third the same quantity of the pyrogallol chelate. I planted equal quantities of rye grass seeds to each of these flower pots and kept them watered with equal quantities of water. All three sprouted at the same time and were kept where they were exposed to equal sunshine. The two chelate stands of grass viewed together were equally robust and well colored and were better than the third.

I have found that increasing the quantity of tannin extract to 25 to 1 relative to the iron does not impair my chelate, and that by mixing the two dry ingredients with an absorptive medium such as sawdust or ground straw then wetting the mass with $H_2O$ and thoroughly mixing it wet yields a good product, especially if it contains nitrogen, phosphorus and potash and is a good balanced fertilizer for the roots of plants.

EXAMPLE 2 i mixed the same kind of fertilizer as in Example 1 with sterile sand and divided it into two equal portions each enough to fill a flower pot. To the first I added nothing and to the second I added ½% of a mixture of equal parts of katechol and pyrogallol chelates of iron. I planted each flower pot with 1 gram of Kentucky Blue Grass seed and kept both well watered and side by side in the sun. The grass with the mixture of iron chelates grew taller, more robust and of better color than that without the iron chelate.

It is noted that the tannin extract used in my experiments contained approximately 20 to 40% by weight of tannin. As mentioned supra., the cast iron contained 90–92% Fe by weight. Thus, I have found that a useable iron chelate source of iron for plants can be formed by use of a weight ratio or vegetable tannin to Fe in the range of 2:1 to approximately 11:1. It is noted that other weight ratios of vegetable tannin to Fe may be found to be suitable and that the formation of the iron chelate plant iron source of the present invention has been found to be evidenced by a black colored reaction product.

As aforementioned, one known source of the vegetable tannin is the wood of the redwood tree, i.e., *sequoia sempervirens*. The wood of the redwood tree when in its natural state has been found when applied to the soil or used as a growing medium to be highly poisonous to many plants. Surprisingly and unexpectedly it is believed to have been determined that by reacting Fe with the vegetable tannin naturally occurring in redwood, the reacted redwood, in addition to becoming a plant source of iron, loses its plant poisonous characteristic and becomes particularly suited for use as a plant growing medium. This improved growing medium may be formed in the manner heretofore suggested herein, i.e., by mixing the redwood in a comminuted state (such as sawdust, chips or the like) with a comminuted source or form of Fe (such as powdered cast iron) and wetting the mixture with water ($H_2O$). The reacted redwood then acts as a plant source of iron and plant stimulant which may be used to treat plants, as whole or part of a plant growing medium, such as in container growing, or as a soil amendment. It is noted since redwood decays and decomposes at a notably slow rate that its use in treating plants, as a growing medium or as a soil amendment, does not cause any significant degree of nitrogen deficiency in the plants.

I claim:

1. A growing medium for plants useable as soil or as a soil amendment comprising comminuted redwood with the vegetable tannin naturally occurring in the redwood reacted by a process consisting essentially of reacting Fe with the vegetable tannin of the redwood to form an iron chelate.

2. The growing medium for plants defined in claim 1, wherein the Fe and vegetable tannin of the redwood are reacted in said process in the presence of $H_2O$.

3. The growing medium for plants defined in claim 2, wherein the Fe is reacted in said process in a comminuted state.

4. The growing medium for plants defined in claim 2, wherein the ratio by weight of the Fe reacted in said process to the vegetable tannin of the redwood is in the range of 1:2 to 1:11.

5. The growing medium for plants defined in claim 4, wherein the Fe is reacted in said process in a comminuted state.

6. The growing medium for plants defined in claim 2, wherein the Fe and the vegetable tannin of the redwood are reacted in said process in the presence of $H_2O$ by mixing water and powdered iron in its elemental state with the comminuted redwood.

7. The growing medium for plants defined in claim 6, wherein the ratio by weight of the Fe reacted in said process to the vegetable tannin of the redwood is in the range of 1:2 to 1:11.

8. A method of supplying iron to plants and stimulating plant growth comprising growing the plants in a growing medium comprised at least in part of comminuted redwood containing the vegetable tannin naturally occurring in the redwood and having the vegetable tannin of the redwood reacted by a process consisting essentially of reacting Fe with the vegetable tannin of the redwood to form an iron chelate.

9. The method of supplying iron to plants and stimulating plant growth of claim 8, wherein the Fe and vegetable tannin of the redwood are reacted in said process in the presence of $H_2O$.

10. The method of supplying iron to plants and stimulating plant growth of claim 9, wherein the Fe is reacted in said process in a comminuted state.

11. The method of supplying iron to plants and stimulating plant growth of claim 9, wherein the ratio by weight of the Fe reacted in said process to the vegetable tannin of the redwood is in the range of 1:2 to 1:11.

12. The method of supplying iron to plants and stimulating plants growth of claim 11, wherein the Fe is reacted in said process in a comminuted state.

13. The method of supplying iron to plants and stimulating plant growth of claim 9, wherein Fe and the vegetable tannin of the redwood are reacted in said process in the presence of $H_2O$ by mixing water and powdered iron in its elemental state with the comminuted redwood.

14. The method of supplying iron to plants and stimulating plant growth of claim 13, wherein the ratio by weight of the Fe reacted in said process to the vegetable tannin of the redwood is in the range of 1:2 to 1:11.

15. A method of supplying iron to plants and stimulating plant growth comprising growing plants in a growing environment at least in part consisting essentially of the reaction product of comminuted redwood containing the vegetable tannin naturally occurring in the redwood combined with $H_2O$ and comminuted Fe.

16. The method of claim 15, wherein the $H_2O$, Fe and redwood are reacted by mixing water and powdered iron in its elemental state with the comminuted redwood.

17. A growing medium for plants useable as soil or as a soil amendment consisting essentially of the reaction product of comminuted redwood containing the vegetable tannin naturally occurring in the redwood, comminuted Fe and $H_2O$.

18. The growing medium for plants defined in claim 17, wherein the $H_2O$, Fe and redwood are reacted by mixing water and powdered iron in its elemental state with the comminuted redwood.

19. A growing medium for plants comprising the combination of Fe, and vegetable tannin reacted by the presence of $H_2O$ and in the presence of an alkaline material to provide a plant growth stimulant and iron source.

20. The growing medium for plants defined in claim 19, wherein the Fe is in a comminuted state.

21. The growing medium for plants defined in claim 20, wherein the ratio by weight of the Fe to the vegetable tannin is in the range of 1:2 to 1:11.

22. The growing medium for plants defined in claim 19, wherein the ratio by weight of the Fe to the vegetable tannin is in the range of 1:2 to 1:11.

23. A growing medium for plants comprising the combination of Fe, and vegetable tannin reacted after being combined by the presence of $H_2O$ and in the presence of an alkaline material to produce a plant growth stimulant and iron source.

24. The growing medium for plants defined in claim 23, wherein the Fe is in a comminuted state.

25. The growing medium for plants defined in claim 23, wherein the ratio by weight of the Fe to the vegetable tannin is in the range of 1:2 to 1:11.

26. The growing medium for plants defined in claim 25, wherein the Fe is in a comminuted. state.

* * * * *